United States Patent
Cunningham, IV et al.

(10) Patent No.: US 11,757,494 B2
(45) Date of Patent: Sep. 12, 2023

(54) RFID READER WITH CONFIGURATION FOR EITHER AN INTERNAL ANTENNA OR EXTERNAL ANTENNA

(71) Applicant: Hand Held Products, Inc., Charlotte, NC (US)

(72) Inventors: Charles Joseph Cunningham, IV, Mount Laurel, NJ (US); Gopalakrishnan Rangarajulu, Fort Mill, SC (US); Shashidar Ramamurthy, Fort Mill, SC (US); Abhay Ravi Chandran, Mount Laurel, NJ (US)

(73) Assignee: HAND HELD PRODUCTS, INC., Charlotte, NC (US)

(*) Notice: Subject to any disclaimer, the term of this patent is extended or adjusted under 35 U.S.C. 154(b) by 0 days.

(21) Appl. No.: 17/452,273

(22) Filed: Oct. 26, 2021

(65) Prior Publication Data

US 2022/0149896 A1    May 12, 2022

Related U.S. Application Data

(60) Provisional application No. 63/112,892, filed on Nov. 12, 2020.

(51) Int. Cl.
*H04B 5/00* (2006.01)
*H04B 1/3827* (2015.01)

(52) U.S. Cl.
CPC ........... *H04B 5/0062* (2013.01); *H04B 1/385* (2013.01)

(58) Field of Classification Search
CPC .......... G06K 7/10198; G06K 7/10356; G06K 7/10386; G06K 7/10396; H04B 1/385; H04B 5/0062
See application file for complete search history.

(56) References Cited

U.S. PATENT DOCUMENTS

| | | | |
|---|---|---|---|
| 6,437,577 B1 * | 8/2002 | Fritzmann | H01Q 1/32 343/703 |
| 9,900,061 B1 | 2/2018 | Lui et al. | |
| 10,095,894 B1 * | 10/2018 | Bellows | G06K 17/0029 |
| 2010/0271187 A1 | 10/2010 | Uysal et al. | |
| 2012/0139712 A1 | 6/2012 | Jung et al. | |
| 2016/0117899 A1 * | 4/2016 | Chevalier | B25H 3/02 340/572.1 |
| 2016/0204643 A1 * | 7/2016 | Manova-Elssibony | H02J 50/70 320/108 |
| 2022/0207250 A1 * | 6/2022 | Li | G06K 7/10128 |

OTHER PUBLICATIONS

European search report dated Feb. 28, 2022 for EP Application No. 21207738.
Intention to grant dated Apr. 14, 2023 for EP Application No. 21207738, 9 page(s).

* cited by examiner

Primary Examiner — Omer S Khan
(74) Attorney, Agent, or Firm — Alston & Bird LLP

(57) ABSTRACT

Various example embodiments described herein relate to a method for selecting antennas in an RFID reader. In some examples, the method includes determining that at least one external antenna and internal antenna are connected to the RFID reader; selecting the at least one external antenna and internal antenna; and performing a read operation based on the selected at least one external antenna and internal antenna.

10 Claims, 5 Drawing Sheets

RFID READER WITH CONFIGURATION FOR EITHER AN INTERNAL ANTENNA OR EXTERNAL ANTENNA

CROSS-REFERENCE TO RELATED APPLICATIONS

This application claims the benefit of U.S. Provisional Application No. 63/112,892 filed Nov. 12, 2020, the contents of which are hereby incorporated by reference in their entirety.

TECHNOLOGICAL FIELD

Exemplary embodiments of the present disclosure relate generally to radio frequency identification (RFID) readers, more particularly, to methods and systems for detecting a presence of external antennas and internal antennas in RFID readers.

BACKGROUND

A typical wearable RFID reader may be at least used in a material handling environment (e.g. a distribution center, a warehouse etc.) for multiple workflows such as asset-tracking (e.g., but not limited to, articles, items, packages, shipments, boxes, etc.). In some examples, one or more RFID tags may be placed or attached to one or more assets that are to be tracked. Further, in some examples, the RFID system may include a distributed antennas set-up, i.e. an antenna configuration including multiple RFID antennas that may be installed at various locations. In some examples, the RFID antennas and the one or more RFID readers may be connected over a distributed communication network. That said, the one or more RFID readers may be configured to read via the multiple RFID antennas, the one or more RFID tags (placed on the one or more assets) either continuously or periodically, thereby, tracking the assets.

SUMMARY

The following presents a simplified summary to provide a basic understanding of some aspects of the disclosed method and related devices for selecting one or more antennas in an RFID device. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method for selecting antennas. In some examples, the method includes determining that at least one external antenna and internal antenna are connected to the RFID reader; selecting the at least one external antenna and internal antenna; and performing a read operation based on the selected at least one external antenna and internal antenna.

Various example embodiments described herein relate to an apparatus that includes a processor and a non-transitory memory including computer program instructions configured to, when executed by the processor, cause the electronic device to at least determine that at least one external antenna and internal antenna are connected to the apparatus; select the at least one external antenna and internal antenna; and perform a read operation based on the selected at least one external antenna and internal antenna.

Various example embodiments described herein relate to an RFID reader that includes one or more external antennas and one or more internal antennas. In some examples the RFID reader is configured to detect whether one or more external antennas and the one or more internal antennas are connected to the RFID reader. In some examples, the RFID reader uses the connected one or more external antennas or the connected one or more internal antennas for a reading operation to read one or more RFID tags.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
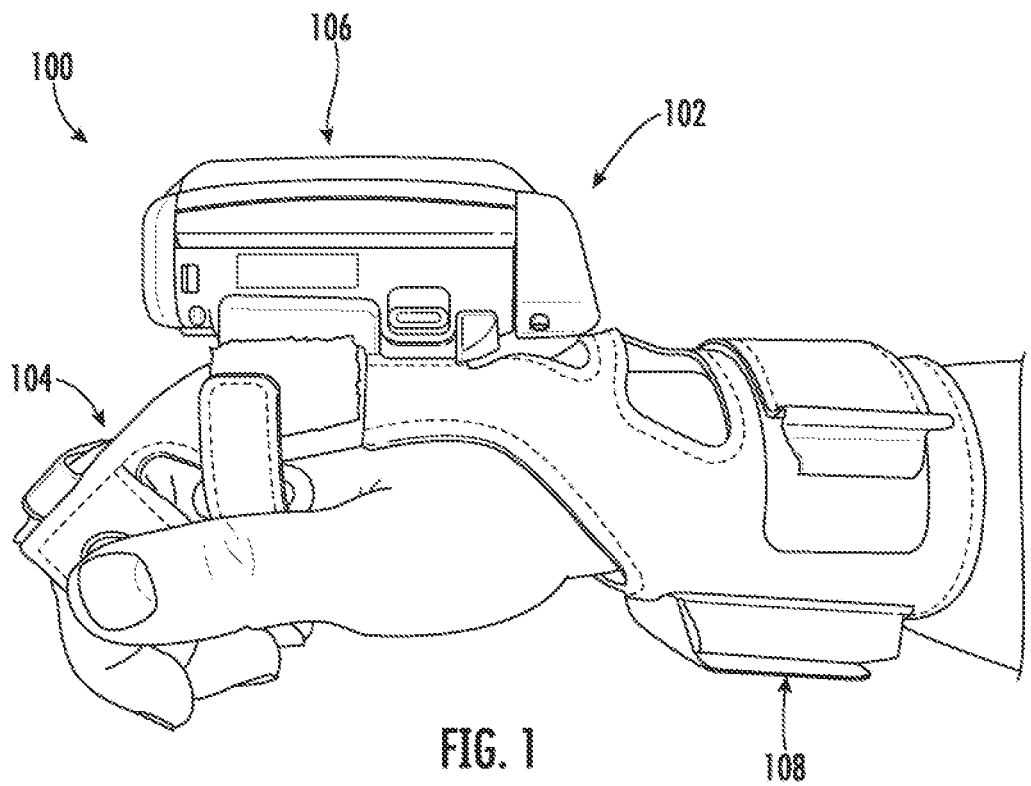
FIG. 1 illustrates an exemplary environment 100 comprising a wearable radio frequency identification (RFID) reader mounted on a glove of an operator in the environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "radio frequency (RF) tag" is used herein to correspond to an electronic component that transmits or receives information or date via an antenna. In some examples, the RFID tag includes an integrated circuit (IC), an antenna element, and a substrate. In an example embodiment, the antenna element can be fabricated on the substrate and the IC can be attached to the substrate. Further, the IC can be communicatively coupled to the antenna element through an interconnect on the substrate. In an example embodiment, the integrated circuit in the RFID tag can be configured to store encoded information or encoded data. In some examples the RFID tag can be configured to operate in various RF frequency bands such as, but not limited to, 13.56 MHz (hereinafter High Frequency Band) or 860 MHz-960 MHz (UHF band). In some example embodiments, the RFID tag can have a dedicated power source that can enable the RFID tag to communicate with one or more components, such as an RF encoder and an RF reader. Such RFID tags are referred to as active RFID tags.

In some example embodiments, an environment (e.g., but not limited to, a warehouse, an inventory, a distribution center, a material handling environment, a logistics transport carrier, and/or the like) may include a distributed antenna network set-up having a plurality of RFID antennas that may be installed at various locations. Further, the environment may also include one or more RFID readers that may communicate with one or more of the plurality of RFID antennas to interrogate RFID tags. In some examples, an RFID tag may be associated with an asset (e.g. a shipment, a cart, a package, an item, a product, etc.) to track and identify the asset within the environment. Such environments may include an RFID system configuration having distributed RF antennas. Typically, distributed antenna systems are used in the wireless field for many applications (e.g., to boost broadband mobile wireless coverage). For example, distributed antenna systems may include many antennas tuned to match the area, such as of a building or venue or an area of a storage location (e.g. inventory) where increased signal strength or a boosted service is desired or needed. Usually, in order to use RFID technology in a distributed antenna system environment, multiple readers or multiple antenna multiplexers (controllers), controller devices (e.g., readers and/or multiplexers) and coaxial cables can be used. That said, some example embodiments described herein relates to an RFID system having such configuration of the distributed antennas that may operate over RF and may be installed in the industrial environment (e.g. a warehouse) to identify RF tags associated with assets.

Various example embodiments described herein relates to an RFID system for identifying an RFID tag, for example, from amongst multiple RFID tags. By way of implementation of some example embodiments described herein, an approximate location of a desired RFID tag within an environment can be identified by the RFID system. In some example embodiments, the RFID system can comprise: an RFID reader, an array of external antennas that can be installed at various locations within an area, and a plurality of RFID tags associated with respective assets. In some example embodiments, the RFID reader of the RFID system may be configured to detect an approximate location of a desired RFID tag in an area.

According to an example environment, a plurality of RFID tags can be associated to assets stored in a warehouse. To this end and in some cases, to locate the desired assets from amongst multiple assets in the warehouse, a worker may use an RFID reader (e.g., but not limited to, of a portable data terminal PDT). In such an environment, it is desirable for the RFID reader to be able to identify if an external antenna is connected to it and selected for use or allow a user to manually select for use either the external antenna or an internal antenna of the RFID reader for the entire reading operation. It is also be desirable for the RFID reader to select one of the external antennas or the internal antennas of the RFID reader fora duration of time during the reading operation and select the other antenna for the next duration of time of the reading operation.

Embodiments of the present invention recognize that the reading ranges and the number of RFID tags to be read may differ widely from time to time within the material handling environment. These differing conditions may present design constraints while constructing the RFID antennas, which may either be external antennas or internal antennas. External RFID antennas are not mechanically coupled to the housing of the RFID reader but are instead electronically connected to a receiver in the RFID reader and may be mounted at a different location. Internal RFID antennas are fastened to the housing of the RFID reader for transmitting and receiving RFID signals. For some warehouse workflows, in which the RFID tags to be read are limited and the RFID tags are present within a short range from the RFID reader, the internal RFID antenna may prove to be ideal. In other warehouse workflows which the RFID tags to be read may be present at a significantly long range and the number of RFID tags to be read may be high, the external RFID antenna may be required. There may be significant loss of power in such situations which is challenging and may impact productivity, as the RFID reader may always have the internal antenna connected while connectivity with the external antenna is not always guaranteed.

In some examples herein, an RFID reader can detect an instance in which the external antenna is connected and determine which one of the external and the internal antenna would be most suitable for efficient operation with respect to the current workflow. In some example embodiments, the RFID reader may be configured to identify whether an external antenna is connected to the RFID reader based on a manual configuration setting of the RFID reader. A user may manually set a value of antenna settings to 0 when an external antenna is connected and to 1 when an external antenna is not connected.

Further, in some example embodiments, the RFID reader may have an auto-detection system configuration setting which is initiated on powering the RFID reader. The RFID reader scans for antenna ports by transmitting a test signal. Based on return loss or the transmitted test signal, the RFID reader determines whether an external antenna is connected to the RFID reader. In some examples, the return loss of the transmitted test signal denotes signal power reflected or returned to the RFID reader due to discontinuities in transmission lines and is measured as a ratio of reflected power of the transmitted test signal to incident power of the transmitted test signal. In some examples and when the external antenna is connected, the return loss is low because the incident power of the transmitted test signal is significantly higher than the reflected power of the transmitted test signal. Similarly and in some examples, when the external antenna is not connected, the return loss is high because the incident power of the transmitted test signal is significantly lower than the reflected power of the transmitted test signal. The RFID reader compares a value of the return loss to a predetermined threshold value to determine whether the external antenna is connected to the RFID reader.

In some example embodiments, when the RFID reader has identified whether an external antenna is connected, the RFID reader may transmit a manual command to select one of the external antenna or the internal antenna for a reading operation. In some example embodiments, the user can use commands such as RF_ANT1/RF_ANT2 to select the desired antenna. In yet other example embodiments, after the scan for the external antenna is complete and no external antenna is identified, the RFID reader may select the internal antenna for the reading operation. In yet other example embodiments, the RFID reader may detect that both the external antenna and the internal antenna are connected and select the external antenna for the reading operation. In yet other example embodiments, the reading operation may be divided between the external antenna and the internal antenna in such a manner that the external antenna performs the reading operation for a first duration of time, and the internal antenna may perform the reading operation for a second duration of time.

FIG. 1 illustrates an exemplary environment 100 comprising a wearable radio frequency identification (RFID) reader 102 mounted on a glove 104 of an operator in the environment 100, according to one or more embodiments described herein. In some example embodiments, the environment 100 may correspond to an industrial environment (e.g., but not limited to, a warehouse, a distribution center, an inventory, a shipping center, a transport carrier, a lorry, a logistic vehicle, a material handling site, and/or the like). The RFID reader 102 may comprise an internal antenna 106. An external antenna 108 may be attached to the glove 104. In an example embodiment, the external antenna 108 and the RFID reader 102 may be communicatively coupled to each other using an RFID cable (not shown). In some example embodiments, the RFID reader may be a wearable device designed to be worn on various parts of the body. For example, the RFID reader may be incorporated into a hat, vest, jacket, footwear, or other article of clothing commonly worn by operators in material handling environments. In other example embodiments, the RFID reader may be incorporated into devices worn or used by operators when handling tagged items, such as a barcode scanner, or weight-belt. In other example embodiments, the RFID reader may be a handheld device used by an operator in the material handling environment.

According to some example embodiments, the RFID reader 102 may include suitable logic and/or circuitry that may enable the RFID reader 102 to retrieve the encoded data from the RFID tags. In some examples, the RFID tags may store encoded data such as a card number, a product identifier, SKU number, and/or the like.

In some example embodiments, the external antenna 108, as illustrated in FIG. 1, may correspond to a distributed antenna system that may be installed within the environment 100 (e.g. a warehouse). The distributed antenna system may represent a configuration of multiple external antennas communicatively coupled via a communication circuitry such as, but not limited to, coaxial cables. Further, the external antenna 108 in the distributed antenna system may be communicatively coupled to the RFID reader 102.

Figure 2:
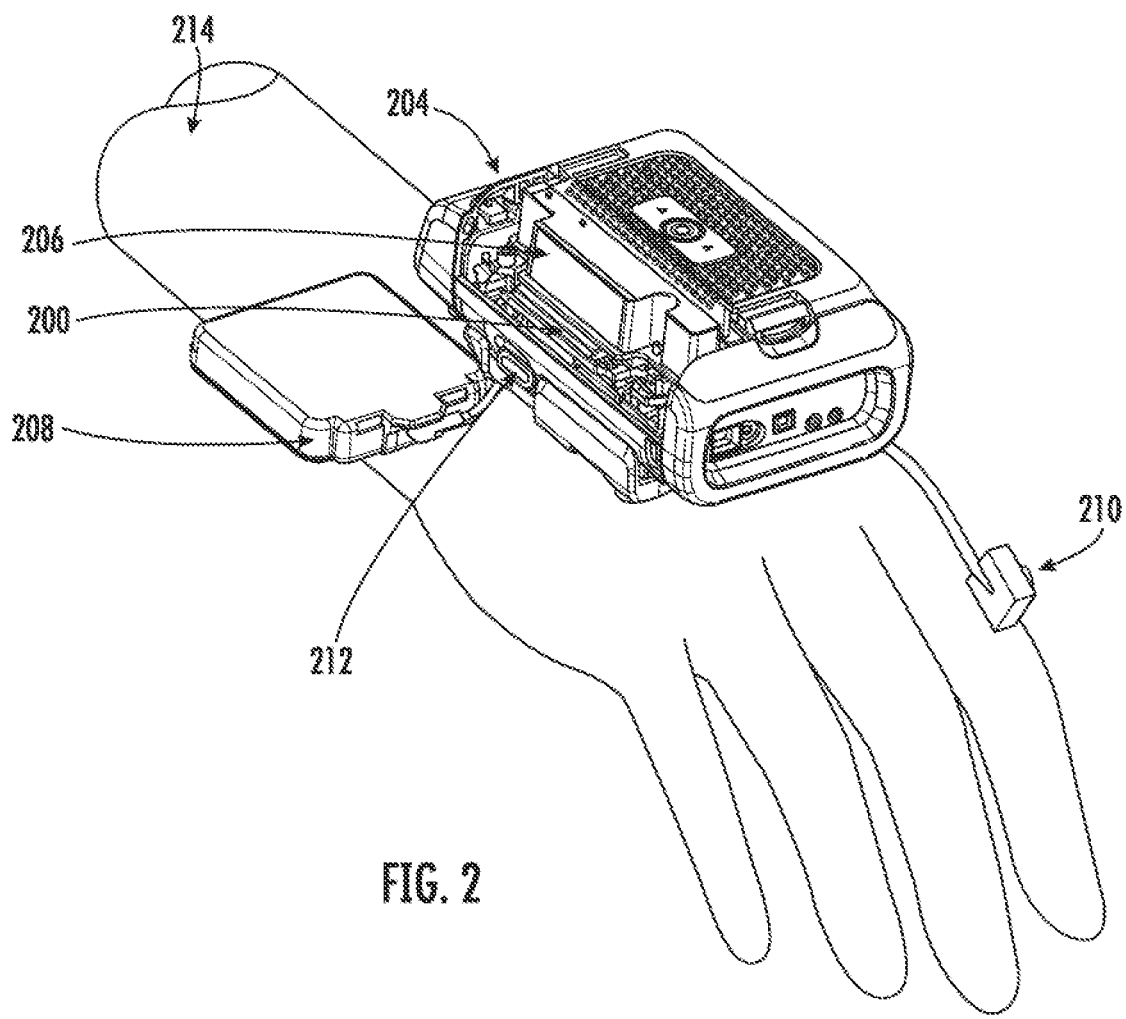
FIG. 2 illustrates the RFID reader, according to one or more embodiments described herein.

FIG. 2 illustrates the RFID reader 202, according to one or more embodiments described herein. In an example embodiment, the RFID reader 202 can include, a display screen 204, an internal RFID reader antenna 206, an external RFID reader antenna 208, a trigger button 210 and an antenna powering system 212. In some examples, the display screen 204, the internal RFID reader antenna 206, the external RFID reader antenna 208 and the antenna powering system 212 can be communicatively coupled with each other.

In some example embodiments, the internal RFID reader antenna 206 and the external RFID reader antenna 208 can be similar to each other in construction. The internal RFID reader antenna 206 can correspond to an active element of the RFID reader 202 that may be configured to generate RF signals when a voltage signal is applied at the antenna element. The internal RFID reader antenna 206 and the external RFID reader antenna 208 may be configured to generate the RF signal in HF frequency band. In another example, the internal RFID reader antenna 206 and the external RFID reader antenna 208 may generate the RF signal in the UHF frequency band. Some examples of the internal RFID reader antenna 206 and the external RFID reader antenna 208 may include, but are not limited to, bow tie antenna, dipole antenna, monopole antenna, loop antenna, patch antenna, and/or the like.

According to some example embodiments, the trigger button 210 may include suitable logic and/or circuitry that may facilitate a worker 214 to provide input to the RFID reader 202. In an example embodiment, the trigger button 210 may either be an electro-mechanical button that may be configured to generate an electrical signal when the trigger button 210 is pressed. Further, the trigger button 210 may be communicatively coupled to the antenna powering system 212. In some example embodiments, the trigger button 210 may be a touch-sensitive button, or a gesture-based button.

According to some example embodiments, the antenna powering system 212 may include suitable logic and/or circuitry that may enable the RFID reader 202 to enable powering on of the internal RFID reader antenna 206 and the external RFID reader antenna 208.

Figure 3:
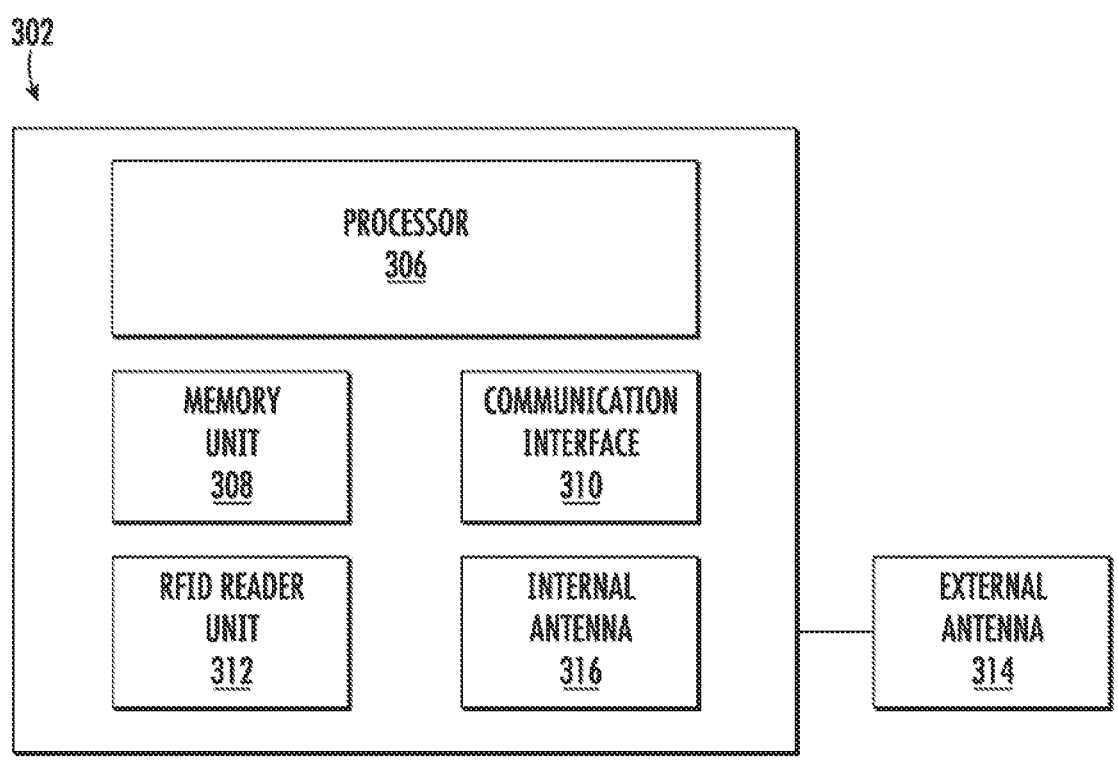
FIG. 3 illustrates a block diagram of the RFID reader which is be configured perform a reading operation, according to one or more embodiments described herein.

FIG. 3 illustrates a block diagram of the RFID reader 302 which may be configured to perform a reading operation 304, according to one or more embodiments described herein. The RFID reader 302 can include a processor 306, a memory unit 308, a communication interface 310, an RFID reader unit 312, an external RFID antenna 314, and an internal RFID antenna 316.

In some example embodiments, the processor 306 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single processor, in an embodiment, the processor 302 may include a plurality of processors and signal processing modules. The plurality of processors may be embodied on a single electronic device or may be distributed across a plurality of electronic devices collectively configured to function as the circuitry of the RFID reader 302. In some examples, the plurality of processors may be in operative communication with each other and may be collectively configured to perform one or more functionalities of the circuitry of the RFID reader 302, as described herein. In an example embodiment, the processor 306 may be configured to execute instructions stored in the memory unit 304 or otherwise accessible to the processor 306. According to various example embodiments described herein, these instructions, when executed by the processor 306, may cause the circuitry of the RFID reader 302 to perform one or more of the functionalities, as described herein.

The memory unit 308 may include suitable logic, circuitry, and/or interfaces that are adapted to store a set of instructions that is executable by the processor 306 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory unit 308 may be integrated with the processor 302 on a single chip, without departing from the scope of the disclosure.

The communication interface 310 may correspond to an interface that may facilitate transmission and reception of messages and data to and from various components and/or devices. In some example embodiments, through the communication interface 310, the external RFID antenna 314 and the internal RFID antenna 316 of the RFID reader 302 may be configured to communicate signals transmitted by the RFID reader 302. Examples of the communication interface 310 may include, but are not limited to, an antenna, an Ethernet port, a USB port, a serial port, or any other port that can be adapted to receive and transmit data. In some example embodiments, the communication interface 306 can transmit and receive data and/or messages in accordance with the various communication protocols, such as, I2C, TCP/IP, UDP, and 3G, 4G, 4G or 5G communication protocols. In some example embodiments, the communication interface 306 may include suitable logic and/or circuitry that may be configured to communicate with the one or more components of the antennas 106, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol.

In some example embodiments, the RFID reader 302 may include a signal processing unit (not shown) that may include suitable logic and/or circuitry for analyzing input signals received from one or more components. For example, the signal processing unit may include a digital signal processor that may be configured to identify peaks and valleys in the received signals. Further, the signal processing, unit may utilize one or more signal processing techniques such as, but not limited to, Fast Fourier Transform (FFT), Discrete Fourier Transform (DFT), Discrete Time Fourier Transform (DTFT) to analyze the received signals. In some examples, the signal processing unit may be implemented using one or more hardware components, such as, but not limited to, FPGA, ASIC, and the like.

In accordance with some example embodiments, the RFID reader 302 may be configured to identify if the external RFID antenna 314 is communicatively connected to the RFID reader 302. The RFID reader 302 may be manually configured by a worker to set the value of antenna settings to 0 if the external RFID antenna 314 is not connected and vice versa. The worker may configure the antenna settings of the RFID reader 302 using menu commands, programming barcodes, using an application programming interface and/or the like.

In another example embodiment, the RFID reader 302 may comprise an auto-detection system 318 that may be configured to identify the presence of the external RFID antenna 314. The auto-detection system 318 may initiate scanning of antenna ports in the readable range by transmitting a test signal 320. Based on the return loss of the test signal 320, the RFID reader 302 may determine if the external RFID antenna 314 is communicatively connected to the RFID reader 302. For example, if the return loss in the power of the transmitted test signal 320 is below a threshold value, that is, if reflected power of the transmitted test signal is lower than incident power of the transmitted test signal compared to the threshold value, the RFID reader 302 may determine that the external RFID antenna 314 is connected to the RFID reader 302. If the return loss in the power of the transmitted test signal 320 is above the threshold value, that is, if the reflected power of the transmitted test signal is higher than the incident power of the transmitted test signal compared to the threshold value, the RFID reader 302 may determine that the external RFID antenna 314 is not connected to the RFID reader 302 and may select the internal RFID antenna 316 to perform the reading operation 304.

In accordance with some example embodiments, upon determining whether the external RFID antenna 314 is connected to the RFID reader 302, the RFID reader 302 may determine which of the external RFID antenna 314 and the internal RFID antenna 316 to select to efficiently perform the reading operation 304. In one of the example embodiments, the worker operating the RFID reader 302 may manually select one or more external RFID antennas 314 or internal RFID antennas 316 based on the reading operation 304. For example, if the reading operation 304 requires the reading of a limited number of RFID tags which are at a short distance from the RFID reader 302, the worker may select the internal RFID antenna 316 to perform the reading operation 304. In another example, if the reading operation 304 requires the reading of a large number of RFID tags which are placed at positions across the warehouse which are significantly far away from the RFID reader 302, the worker may select the external RFID reader 314 to perform the reading operation 304. In some examples, the worker may use commands such as RF_ANT1/RF_ANT2 to select a desired antenna. In some example embodiments, the selection of the internal RFID antenna 316 may be associated with low-power usage reading operations and the selection of the external RFID antenna 314 may be associated with high-power usage reading operations.

In one of the example embodiments, when the RFID reader 302 determines that the external RFID antenna 314 and the internal RFID antenna 316 are both connected to the RFID reader 302, the RFID reader 302 may select the external RFID antenna 314 to perform the reading operation 304.

In one of the example embodiments, when the RFID reader 302 determines that the external RFID antenna 314 and the internal RFID antenna 316 are both connected to the RFID reader 302, the RFID reader 302 may alternately select the external RFID antenna 314 and the internal RFID antenna 316 based on a duty-cycle antenna usage. For example, for a first time interval T1 of performing the reading operation 304, the RFID reader 302 may select the external RFID antenna 314. For the next time interval T2 of performing the reading operation 304, the RFID reader 302 may switch to the internal RFID antenna 316. For the next time interval T3 of the reading operation 304, the RFID reader 302 may switch back to the external RFID antenna 314. In one of the example embodiments, the duration of the time interval when the internal RFID antenna 316 is selected by the RFID reader 302 may or may not be equal to the duration of the time interval when the external RFID antenna 314 is selected by the RFID reader 302.

Figure 4:
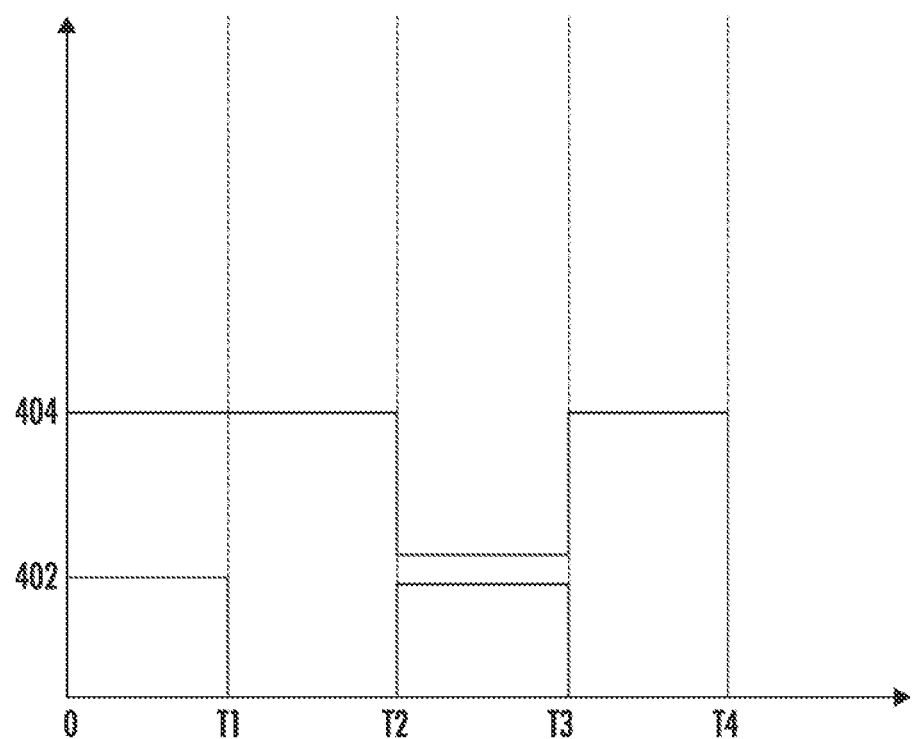
FIG. 4 illustrates a timing diagram representing the time taken to perform a reading operation by the RFID reader.

FIG. 4 illustrates a timing diagram representing the time T taken to perform a reading operation by the RFID reader 400. During a time interval T1, a worker may select both an external RFID antenna 402 and an internal RFID antenna 404 to perform the reading operation. For example, the worker may use a command such as ANTSEL2 to manually configure the use of both the external RFID antenna 402 and the internal RFID antenna 404. At time interval T2, the RFID reader 400 may select the external RFID antenna 402 to perform the reading operation. At time interval T3, the RFID reader 400 may switch to the internal RFID antenna

404 to perform the reading operation. At time interval T4, the RFID reader 400 may switch back to the external RFID antenna 402 to complete the reading operation.

Figure 5:
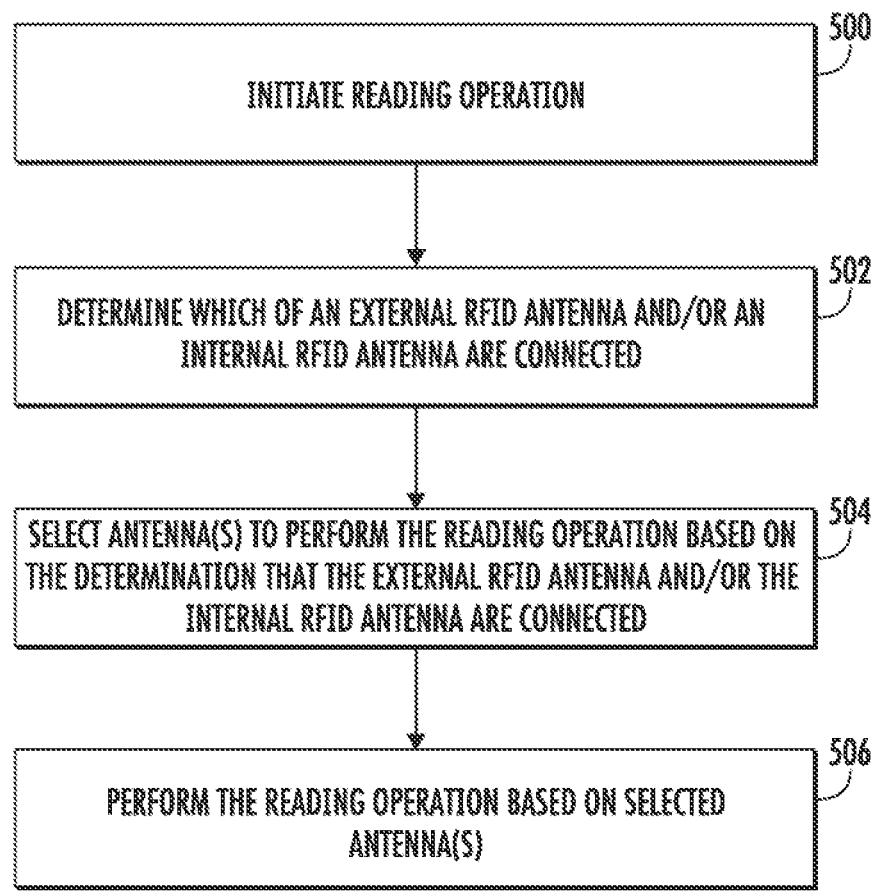
FIG. 5 illustrates an example flowchart representing a method by which an RFID reader identifies an external RFID antenna and determine which antenna of the external RFID antenna and an internal RFID antenna to use, in accordance with some example embodiments described herein.

FIG. 5 illustrates an example flowchart representing a method by which an RFID reader, such as the RFID reader described with respect to FIGS. 1-4 may identify an external RFID antenna and determine which antenna of the external RFID antenna and an internal RFID antenna present in the housing of the RFID reader to use, in accordance with some example embodiments described herein.

The method starts at step 500 when a reading operation is initiated. At step 502, the RFID reader, such as via a processor, memory unit, or the like, may determine which of an external RFID antenna and an internal RFID antenna are connected. In this regard, the RFID reader may have a manual system configuration setting (such as RF_ANT1 for the internal RFID antenna and RF_ANT2 for the external RFID antenna) which may be used by an operator to manually set specific values to identify whether the external RFID antenna and the internal RFID antenna are in connected or disconnected states. For example, the operator may set the value of the configuration settings of RF_ANT1 & RF_ANT2 to 0 when connected and to 1 when not connected. The operator may also use menu commands, programming barcodes, or API present in a processor of the RFID reader to manually identify whether the external RFID antenna is connected to the RFID reader.

Alternatively or additionally, the RFID reader may have an auto-detection system configuration setting which does not require any user inputs to identify whether the external RFID antenna and the internal RFID antenna are in a connected or a disconnected state. The RFID reader, in some examples, initiates a scan of its antenna ports upon powering up the RFID reader or at the start of the scanning/reading operation of the RFID reader.

In some examples, the RFID reader transmits a test signal to each antenna port of the RFID reader and then measures the return loss from the transmitted test signal. The return loss from the transmitted test signal is low when an antenna is connected to the RFID reader and high when the antenna is disconnected from the RFID reader. The return loss value is compared to a predetermined threshold value to determine connectivity of the antenna from the RFID reader.

In some examples, the RFID reader determines whether an antenna is connected or disconnected based on the return loss. When the return loss of the transmitted test signal from the external RFID antenna and the internal RFID antenna is below the threshold value, the RFID reader determines both the external RFID antenna and the internal RFID antenna are connected. When the return loss from the internal RFID antenna is below the threshold value and the return loss from the external RFID antenna is above the threshold value, the RFID reader determines that the internal RFID antenna is connected and the external RFID antenna is disconnected from the RFID reader and uses the internal RFID antenna to perform a reading operation.

In an example embodiment, the auto-detection configuration setting can also be used as a self-test routine to evaluate connectivity of the RFID reader with respect to each antenna.

At step 504, the RFID reader, such as via a processor, memory or the like, may select antenna(s) to perform the reading operation after determining that the external RFID antenna and the internal RFID antenna are connected to the RFID reader. In one example embodiment, the operator may manually select one or more of the external RFID antennas or the internal RFID antennas based on requirements of the reading operation. For example, if the reading operation requires reading a limited number of short range RFID tags, the operator may manually select a command to use the internal RFID antenna only (using a command such as ANTSEL0 to represent use of the internal RFID antenna only). If the reading operation requires reading a large number of long-range RFID tags, the operator may manually select a command to use the external RFID antenna only (using a command such as ANTSEL1 to represent use of the external RFID antenna only).

Alternatively or additionally, the RFID reader, the user, or the like may also initiate auto-detect selection scan of antenna(s) to perform the reading operation after determining that the external RFID antenna and the internal RFID antenna are connected to the RFID reader. After the completion of the auto-detect selection scan, if only the internal RFID antenna is detected, the RFID reader may select the internal RFID antenna to perform the reading operation. After the completion of the auto-detect selection scan, if both the internal RFID antenna and the external RFID antenna are detected, the RFID reader may select the external RFID antenna to perform the reading operation.

Alternatively or additionally, the RFID reader may also initiate a duty-cycle usage selection scan of antenna(s) to perform the reading operation in an instance in which the external RFID antenna and the internal RFID antenna are connected to the RFID reader. In one example embodiment, the RFID reader may use both the external RFID antenna and the internal RFID antenna to perform the reading operation by manually setting the configuration of the RFID reader to use both the external RFID antenna and the internal RFID antenna. In some example embodiments, the RFID reader may also be manually set to use one antenna of the external RFID antenna and the internal RFID antenna at a given interval of time to perform the reading operation.

In some examples, the RFID reader may also perform switching between the external RFID antenna and the internal RFID antenna to perform the reading operation. For example, the RFID reader may spend a duration of time T1 reading RFID tags using the internal RFID antenna. The RFID reader may switch to the external RFID antenna to read RFID tags for a next duration of time T2. The RFID reader may switch back to the internal RFID antenna to read RFID tags for a next duration of time T3. The RFID reader may continue to switch back and forth until the reading operation is complete, the operation is cancelled by the user, and/or the like. The duration of time T1, T2, and T3 may or may not be equal to each other.

In some examples, the RFID reader may select the internal RFID antenna if the RFID reader determines that the external RFID antenna is disconnected from the RFID reader.

At step 506, the reading operation is performed by the RFID reader, such as via a processor, memory or the like, using the selected antenna(s).

In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with one or more other features described herein.

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for selecting antennas in an RFID reader comprising:
   determining that at least one external antenna and internal antenna are connected to the RFID reader;
   determining a quantity of one or more RFID tags and a distance from the RFID reader to the one or more RFID tags based on interrogating the one or more RFID tags using one or more antennas of the at least one external antenna and internal antenna;
   determining requirements of a read operation to read the one or more RFID tags based at least on the quantity of the one or more RFID tags and the distance from the RFID reader to the one or more RFID tags;
   performing a duty-cycle usage selection scan of the at least one external antenna and internal antenna;
   alternately selecting at least one antenna of the at least one external antenna and internal antenna by switching between one or more external antennas and one or more internal antennas based on the duty-cycle usage selection scan and the requirements of the read operation to read the one or more RFID tags;
   performing the read operation to read the one or more RFID tags based on the alternately selected at least one antenna of the at least one external antenna and internal antenna; and
   determining that an external antenna of the at least one external antenna and internal antenna is connected in an instance in which a return loss of test signal transmitted from the RFID reader is below a threshold value and that the external antenna of the at least one external antenna and internal antenna is not connected in an instance in which the return loss of test signal transmitted from the RFID reader is above the threshold value and the RFID reader selects an internal antenna to perform the read operation, wherein the return loss of test signal is determined based on a ratio of a reflected power and an incident power of test signal.

2. The method of claim 1 wherein determining that the at least one external antenna and internal antenna are connected to the RFID reader further comprises receiving a user input indicating a connection status of the at least one external antenna and internal antenna.

3. The method of claim 1 wherein determining that the at least one external antenna and internal antenna are connected to the RFID reader further comprises determining the external antenna of the at least one external antenna and internal antenna is connected based on an auto-detection system configured access a port or a plurality ports of the RFID reader.

4. An apparatus comprising:
   a processor; and
   a non-transitory memory including computer program instructions configured to, when executed by the processor, cause the apparatus to at least:
   determine that at least one external antenna and internal antenna are connected to an RFID reader;
   determine a quantity of one or more RFID tags and a distance from the RFID reader to the one or more RFID tags based on interrogating the one or more RFID tags using one or more antennas of the at least one external antenna and internal antenna;
   determine requirements of a read operation to read the one or more RFID tags based at least on the quantity of the one or more RFID tags and the distance from the RFID reader to the one or more RFID tags;
   performing a duty-cycle usage selection scan of the at least one external antenna and internal antenna;
   alternately select at least one antenna of the at least one external antenna and internal antenna by switching between one or more external antennas and one or more internal antennas based on the duty-cycle usage selection scan and the requirements of the read operation to read the one or more RFID tags;
   perform the read operation to read the one or more RFID tags based on the alternately selected at least one antenna of the at least one external antenna and internal antenna; and
   determine that an external antenna of the at least one external antenna and internal antenna is connected in an instance in which a return loss of test signal transmitted from the RFID reader is below a threshold value and that the external antenna of the at least one external antenna is not connected in an instance in which the return loss of test signal transmitted from the RFID reader is above the threshold value and the RFID reader selects an internal antenna to perform the read operation, wherein the return loss of test signal is determined based on a ratio of a reflected power and an incident power of test signal.

5. The apparatus of claim 4 wherein the non-transitory memory including the computer program instructions configured to, when executed by the processor, cause the apparatus to at least determine that the at least one external antenna and internal antenna are connected to the apparatus further by receiving a user input indicating the connection status of the at least one external antenna and internal antenna.

6. The apparatus of claim 4 wherein the non-transitory memory including the computer program instructions configured to, when executed by the processor, cause the apparatus to at least determine that the at least one external antenna and internal antenna are connected to the apparatus further by determining that the external antenna of the at least one external antenna and internal antenna is connected based on an auto-detection system configured access a port or a plurality of ports of the apparatus.

7. An RFID reader comprising:
   one or more external antennas;
   one or more internal antennas;
   wherein the RFID reader is configured to:
   detect whether the one or more external antennas and the one or more internal antennas are connected to the RFID reader;
   determine a quantity of one or more RFID tags and a distance from the RFID reader to the one or more RFID tags based on interrogating the one or more RFID tags using at least one of the one or more external antennas and the one or more internal antennas;

perform a duty-cycle usage selection scan of the one or more external antennas and the one or more internal antennas;

in response to a determination of requirements of a reading operation to read the one or more RFID tags based at least on the quantity of the one or more RFID tags and the distance from the RFID reader to the one or more RFID tags, alternately select one or more of the one or more external antennas and the one or more internal antennas by switching between the one or more external antennas and the one or more internal antennas based on the duty-cycle usage selection scan and the requirements of the reading operation to read the one or more RFID tags;

wherein the RFID reader uses the alternately selected one or more of the one or more external antennas and the one or more internal antennas to perform the reading operation to read the one or more RFID tags; and determine that an external antenna of the at least one external antenna and internal antenna is connected in an instance in which a return loss of test signal transmitted from the RFID reader is below a threshold value and that the external antenna of the at least one external antenna and internal antenna is not connected in an instance in which the return loss of test signal transmitted from the RFID reader is above the threshold value and the RFID reader selects an internal antenna to perform the read operation, where in the return loss of test signal is determined based on a ratio of a reflected power and an incident power of test signal.

8. The RFID reader of claim 7, wherein the RFID reader is configured to detect whether one or more external antennas are connected to the RFID reader further based on a manual configuration setting.

9. The RFID reader of claim 7, wherein the RFID reader is configured to detect whether one or more external antennas are connected to the RFID reader further based on an auto-detection system configured to analyze at least one port to determine if one or more external antennas are connected.

10. RFID reader of claim 7, wherein the RFID reader is configured to perform the reading operation using a combination of the one or more external antennas and the one or more internal antennas for the reading operation.

* * * * *